United States Patent [19]

Iwata et al.

[11] 4,147,420
[45] Apr. 3, 1979

[54] FLASH CAMERA

[75] Inventors: Hiroshi Iwata; Tetsuo Yamaoka, both of Osaka, Japan

[73] Assignee: West Electric Company, Ltd., Osaka, Japan

[21] Appl. No.: 804,805

[22] Filed: Jun. 8, 1977

[30] Foreign Application Priority Data

Jun. 17, 1976 [JP] Japan .................................. 51-71956

[51] Int. Cl.² ...................... G03B 15/05; G03B 13/08; G03B 13/18; G03B 17/00
[52] U.S. Cl. ..................................... 354/127; 354/198; 354/225; 354/289
[58] Field of Search ............... 354/127, 198, 289, 219, 354/224, 225, 195, 199, 128; 352/170, 171

[56] References Cited

U.S. PATENT DOCUMENTS

| | | | |
|---|---|---|---|
| 3,012,464 | 12/1961 | Papke | 354/219 X |
| 3,393,623 | 7/1968 | Gutmann et al. | 354/219 X |
| 4,041,508 | 8/1977 | Edamoto et al. | 354/289 X |

FOREIGN PATENT DOCUMENTS

| | | | |
|---|---|---|---|
| 1955680 | 5/1971 | Fed. Rep. of Germany | 354/127 |
| 736900 | 9/1975 | United Kingdom | 354/127 |

*Primary Examiner*—Michael L. Gellner
*Attorney, Agent, or Firm*—Cushman, Darby & Cushman

[57] ABSTRACT

In a flash camera having a zone-focusing system and an electronic flash device in one united body, wherein the flash camera comprises an electro-luminescence device for emitting light by AC output fed from a DC-DC converter circuit in the electronic flash device, an indicator having symbol marks for indicating an object distance and illuminated by the electro-luminescence device, and a pointer, linked to a focus-adjusting device for adjusting focus of the main photographic lens of the camera, for pointing the symbol marks on the indicator. The symbol marks can be easily identified through the illumination by the electro-luminescence device and further a voltage decrease of power source battery in the DC-DC converter circuit can be easily and clearly observed.

4 Claims, 9 Drawing Figures

FLASH CAMERA

BACKGROUND OF THE INVENTION

The present invention relates to a flash camera which comprises such a focus-adjusting mechanism as zone focus and an electronic flash device, and more particularly to the flash camera with a novel object distance-indicating means in the flash camera.

A conventional flash camera is constituted in a manner that a focus-adjustment of the main photographic lens can be done with utilizing such symbol marks as numerals or zone marks in a view-finder for indicating an object distance.

However, the conventional flash camera has such a shortcoming that, when the scene or object of photography is dark and thus an artificial light from a strobe flash device is necessary for photographing, a reading of the numeral or observing of the symbol marks is difficult thereby leading to erroneous adjusting of the focus and hence to a failure of photographing. In addition, the conventional flash camera has a further shortcoming in that checking of the capacity of the power source battery for actuating an electronic flash device has required a battery-checking circuit or a battery checking small lamp for showing a condition of "ready for flashing" of the strobe flash tube by means of a lighting period thereof. The checking lamp necessitates a relatively long time for checking the capacity of the power source battery. Thus the check of the capacity of the power source battery has been troublesome.

SUMMARY OF THE INVENTION

It is one object of the present invention to provide a flash camera in which symbol marks for indicating object distance are easily observed through an illumination by a lighting means.

It is another object of the present invention to provide a flash camera in which the capacity of power source battery can be checked through the brightness of light of the lighting means.

DETAILED DESCRIPTION OF THE INVENTION

Figure 1:
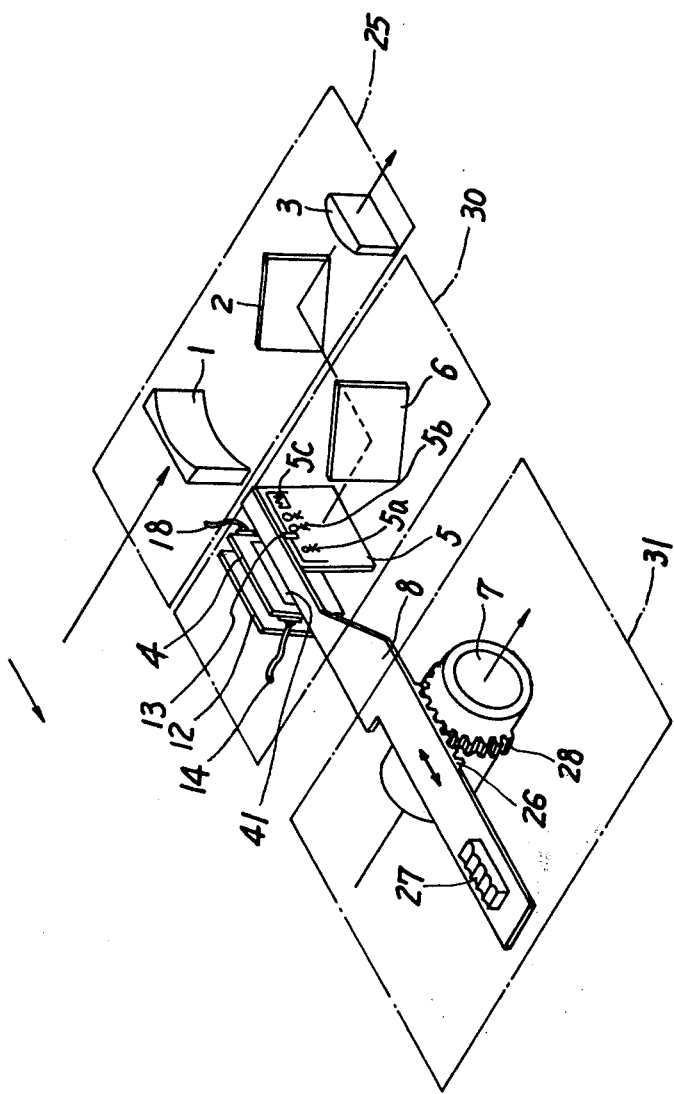
FIG. 1 is a perspective view showing an arrangement among the principal parts of an example of the flash camera according to the present invention.
Figure 2:
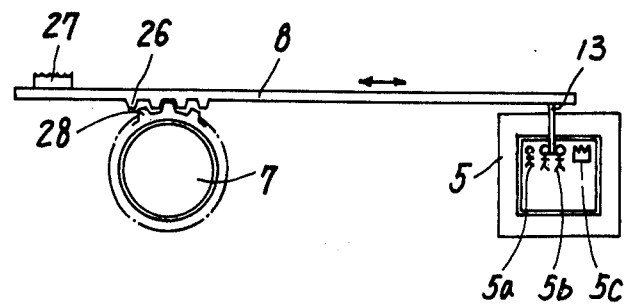
FIG. 2 is a front view showing a structural relationship between a focus-adjusting lever, a main photographic lens and an indicator in FIG. 1.

By referring to examples, the present invention is described in detail as follows:

FIG. 1 shows a structural arrangement among the principal parts of the flash camera of the invention. The flash camera comprises a finder 25, an object-distance indicating means 30 and a focus-adjusting means 31. The finder 25 comprises an objective lens 1, an eye piece 3 and a half-mirror 2. The object-distance indicating means 30 comprises an illuminating window 12 of a translucent glass situated adjacent to the finder 25, a lighting means 4 such as an electro-luminescence device disposed behind the illuminating window 12, an indicator 5 having the symbol marks 5a, 5b & 5c on a transparent or translucent glass or resin plate for indicating an object distance and disposed behind the lighting means 4, and a reflecting mirror 6 disposed behind the indicator 5 for reflecting the images of the symbol marks 5a, 5b, and 5c and the pointer 13 to the half mirror 2. The electrodes 14 and 18 of the lighting means 4 are connected to the terminals a and b, respectively, of a secondary coil of an oscillation transformer 9 in a DC-DC converter circuit 29 of an electronic flash device shown in FIG. 3. The focus-adjusting means 31 shown in FIG. 1 comprises a gear means 28 disposed on the outside face of the main photographic lens 7 for adjusting the focus and a lever 8 for adjusting the focus of the lens 7, the lever 8 having a rack 26 engaging with the gear means 28 and a pointer 13 for indicating the symbol marks on the indicator 5 according to the adjustment of the lever 8 by moving rightward and leftward via a knob 27 thereon, as shown in FIG. 2.

First, in a bright scene case wherein a photograph can be taken under the outside light (namely not by a strobe flash light) because the scene for photographing is bright, then the abovementioned flash camera is handled as follows:

A light from outside of the camera enters from the illuminating window 12, and, passing through the lighting means 4 and the indicator 5 and reflected by the mirror 6 and the half mirror 2, reaches the eye piece 3. Accordingly the images of the symbol marks 5a, 5b and 5c can be observed through the eye piece 3. Thereupon, the focus-adjusting lever 8 is moved in a manner that the pointer 13, linked to the lever 8, points to one of the symbol marks 5a, 5b and 5c in accordance with the selected object distance. According to the movement of the lever 8, the main photographic lens 7 is adjusted forward and backward, so that the focus-adjustment suitable for the object distance can be attained.

Figure 3:
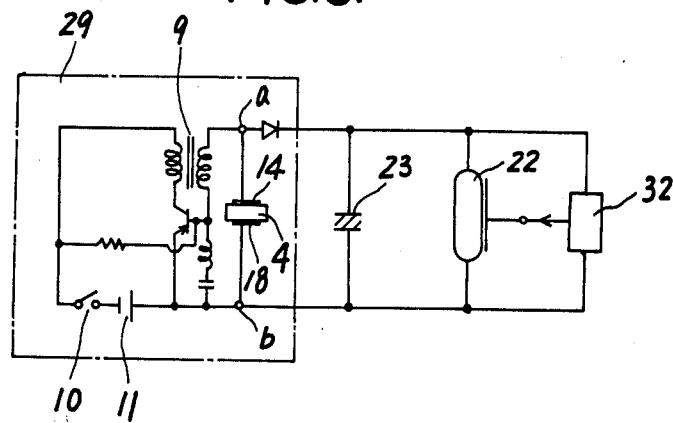
FIG. 3 is a circuit diagram of the flash camera of the present invention.

Secondly, in a flash photographing case wherein the scene for photographing is dark and thus a light from the strobe flash tube 22 is necessary for photographing, then a power source switch 10 in the electronic flash device shown in FIG. 3 is manually closed to actuate the DC-DC converter circuit 29, to generate a high voltage at the secondary coil of the oscillation transformer 9 therein. The high voltage from the DC-DC converter circuit 29 is applied to the electrodes 14 and 18 of the lighting means 4 to emit light, thereby illuminating the symbol marks 5a, 5b and 5c on the indicator 5 and the pointer 13. The images of the illuminated symbol marks 5a, 5b and 5c and the pointer 13 are reflected by the reflecting mirror 6 to the half-mirror 2 and pass through the eye piece 3, thereby enabling the operator of the camera to observe the symbol marks even in a dark place. By handling the focus-adjusting lever 8 with the knob 27 on the lever 8 in order to adjust the focus of the lens 7, the pointer 13 linked to the lever 8 moves along the symbol marks. Accordingly, the focus-adjustment for the lens 7 can be performed by making the image of the pointer 13 point one of the images of the symbol marks corresponding to the object distance.

Then, when a main capacitor 23 is sufficiently charged up by the high voltage from the DC-DC converter circuit 29 thereby making the strobe flash tube 22 ready for flashing, upon a release of the shutter, the trigger circuit 32 sends a trigger signal to the strobe flash tube 22 thereby making it flash.

Thirdly, in a non-flashing long-time exposure in the dark scene wherein the circumstance is so dark that the symbol marks 5a, 5b and 5c can not be observed, the operation is as follows:

At first the switch 10 is closed in order to make the DC-DC converter 29 generate the high voltage to be impressed to the lighting means 4, thereby lighting it. With the help of the illumination by the lighting means 4 the operator selects a position of the pointer 13 on one of the symbol marks 5a, 5b and 5c corresponding to the object distance. Then, the power switch 10 is made open and the shutter is released in a long-time exposure.

Figure 4:
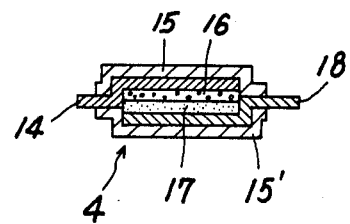
FIG. 4 is a longitudinal sectional view of a part of the frame of an example of a lighting means in the flash camera of the present invention.

The detailed construction of the abovementioned lighting means 4 is elucidated as follows:

As shown in FIG. 4 which is a longitudinal sectional view of the frame part of the lighting means 4, a lighting layer 16 and an insulating layer 17 are piled up and the piled up layers are sandwiched by the electrode layers 14 and 18, and the abovementioned assembly is coated with moisture-resistive layers 15 and 15'. Such assembly is shaped in a square frame surrounding a square see-through window part 41. The lighting layer 16 emits light when the abovementioned high voltage from the oscillation transformer 9 is applied across the electrode layers 14 and 18. The light varies its brightness with the voltage and frequency applied across the electrodes 14 and 18 from the secondary coil of the oscillation transformer 9. The voltage and frequency from the secondary coil of the oscillation transformer 9 in the DC-DC converter circuit 29 is dependent upon the electric capacity of the power source battery 11. Accordingly, when the electric capacity of the battery 11 is low, then the voltage and frequency from the DC-DC converter circuit 29 is low.

Consequently, when the electric capacity of the battery 11 is enough, the light of the lighting means 4 is bright. When the electric capacity of the battery 11 is not enough, the light of the lighting means 4 is dim. By taking advantage of such phenomenon, the check of the capacity of the battery 11 can be performed easily and speedily.

Figure 5:
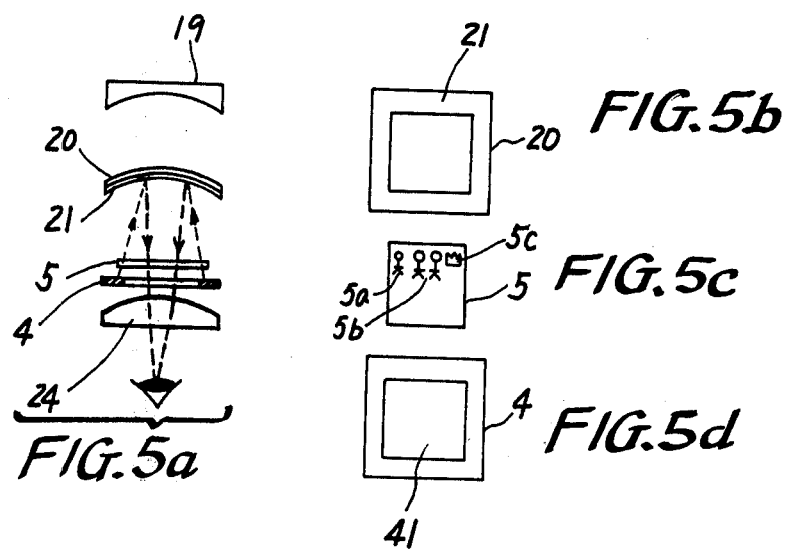
FIG. 5(a) is a plan view of another example of the object-distance indicating means in the flash camera of the present invention.
FIGS. 5(b), (c) and (d) are front views of the frame 20, the indicator 5 and the lighting means 4, respectively, in FIG. 5(a).

FIG. 5 shows an Albada finder embodying the present invention. In the example of FIG. 5, the lighting means 4 of the electro-luminescence device shown in FIG. 4 and FIG. 5(d), an indicator 5 having symbol marks 5a, 5b and 5c as shown in FIG. 5(c) and a concave frame 20 having a light-reflecting face 21 as shown in FIG. 5(b) are disposed in that order between an objective lens 19 and an eye piece 14. On the indicator 5, such pointer (not shown) as aforementioned is disposed with being linked to a focus-adjusting lever (not shown).

In a case where the scenery for photographing is dark and thus a light from the strobe flash tube is necessary for photographing, the power source switch 10 is closed to actuate the DC-DC converter circuit 29. As a result, the lighting means 4 emits light to illuminate the indicator 5. The light from the illuminated symbol marks 5a, 5b and 5c on the indicator 5 is reflected by the reflecting mirror 21 and passes through a transparent window part 41 of the lighting means 4 and comes to the eye piece 24, thereby enabling an operator of the camera to observe the symbol marks.

With such arrangement in the above example of FIG. 5, not only the focus-adjustment in a dark scenery photographing can be certainly done, but also the capacity check of the power source battery can be easily and speedily done.

Figure 6:
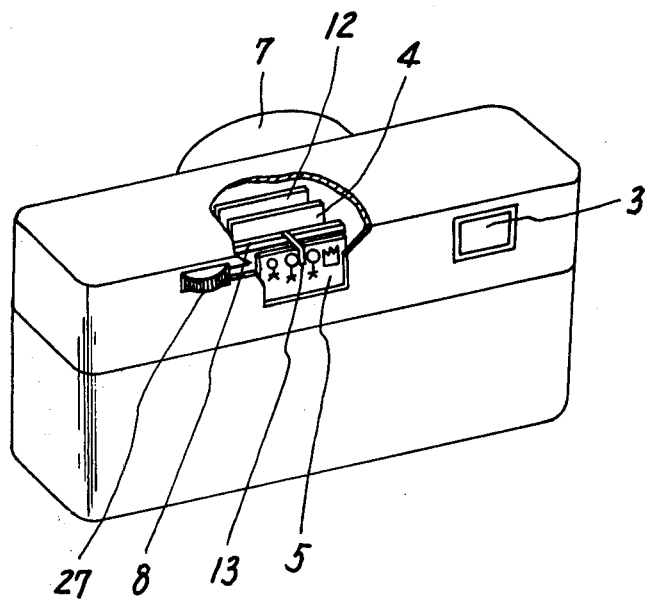
FIG. 6 is a partly fragmental perspective view of another example of the flash camera of the present invention.

In the abovementioned examples, all are constituted such that the symbol marks of the object distance can be observed through the finder. However, as a modification of the above examples it is also possible that, as shown in FIG. 6, the indicator 5 having the symbol marks of the object distance is disposed on an outside face of the flash camera case in a manner to be illuminated by the lighting means 4.

What is claimed is:

1. A flash camera comprising an electronic flash device for flashing a flash tube by an electric charge stored in a capacitor by a high voltage from a DC-DC converter circuit, and a zone focus type focusing system including a finder, an object-distance indicating means and a focus-adjusting means, said indicating means having an indicator with symbol marks of the object distance thereon and a pointer linked to said focus-adjusting means, characterized in that:

said indicating means has an electro-luminescent device which is connected to said DC-DC converter and is situated to illuminate said symbol marks and said pointer and further comprising:

a frame having a light-reflecting face for reflecting the images of said symbol marks and said pointer to an eye piece of said finder.

2. A flash camera of claim 1, wherein said finder comprises an objective lens, an eye piece and a half-mirror inbetween said indicating means comprises a mirror which reflects the image of the symbol marks toward said half-mirror.

3. A flash camera comprising an electronic flash device for flashing a flash tube by an electric charge stored in a capacitor by a high voltage from a DC-DC converter circuit, and a zone focus type focusing system including a finder, an object-distance indicating means and a focus-adjusting means, said indicating means having an indicator with symbol marks of the object distance thereon and a pointer linked to said focus-adjusting means, characterized in that said indicating means has a lighting means which is connected to said DC-DC converter and is situated to illuminate said symbol marks and said pointer; and said camera further comprises a frame having a light-reflecting face for reflecting the images of said symbol marks and said pointer to an eye piece of said finder.

4. A flash camera of claim 3, wherein said finder comprises an objective lens, an eye piece and a half-mirror inbetween and said indicating means comprises a mirror which reflects the image of the symbol marks toward said half-mirror.

* * * * *